United States Patent [19]

Loyd et al.

[11] 4,260,657
[45] Apr. 7, 1981

[54] REINFORCED CERAMIC STRUCTURE

[75] Inventors: Morris S. Loyd, Northridge; Michael S. O'Neill, Tustin, both of Calif.

[73] Assignee: Rockwell International Corporation, El Segundo, Calif.

[21] Appl. No.: 856,880

[22] Filed: Dec. 2, 1977

[51] Int. Cl.³ .............................................. B32B 5/12
[52] U.S. Cl. .................................... 428/113; 428/232; 428/297; 428/367; 428/902
[58] Field of Search ............... 428/105, 113, 232, 408, 428/902, 297, 367, 413, 414; 106/38.35, 38.9, 44, 99; 264/241, 243

[56] References Cited

U.S. PATENT DOCUMENTS

| 3,490,983 | 1/1970 | Lee | 428/113 |
|---|---|---|---|
| 3,676,293 | 7/1972 | Gruber | 106/44 X |
| 3,925,133 | 12/1975 | Olcott | 106/44 X |
| 3,949,126 | 4/1976 | Crawford, Jr. | 428/113 |
| 3,969,124 | 7/1976 | Stewart | 106/44 X |
| 4,048,360 | 9/1977 | Jonda | 428/113 X |
| 4,063,684 | 12/1977 | O'Brien et al. | 428/113 X |
| 4,092,453 | 5/1978 | Jonda | 428/408 X |

Primary Examiner—William J. Van Balen
Attorney, Agent, or Firm—Charles T. Silberberg

[57] ABSTRACT

A reinforced ceramic structure is provided utilizing a composite reinforcing member embedded in a ceramic casting. The reinforcing member is optimally unidirectional composite rope, preferably of graphite epoxy or silicon carbide. By virtue of the thermal expansion rate of the reinforcing member being substantially the same as the ceramic material, the reinforcement member remains integral with the ceramic casting material though subjected to thermal cycles and provides an increase in the tensile strength of ceramic casting heretofore unobtained.

8 Claims, 4 Drawing Figures

REINFORCED CERAMIC STRUCTURE

BACKGROUND OF THE INVENTION

The present invention generally relates to a reinforced ceramic structure. More particularly, the invention is directed to a reinforced ceramic casting using composite rope. The addition of composite rope has now been found to provide a reinforced ceramic casting having substantially increased tensile strength. By virtue of the thermal expansion rate of the composite rope being substantially the same as the ceramic material, the reinforced ceramic casting with increased tensile strength remains integral at elevated temperatures.

In general, ceramic castings are low in cost, non-shrinking, and temperature tolerant. Ceramic castings have been used for years in the metal forming and glass forming fields and are presently being used for tooling and dies where composite parts and assemblies are fabricated for subsequent curing in an autoclave or oven and where metal parts are superplastically formed or diffusion bonded. Ceramic castings have tremendous strength in compression, but are weak in tension and prone toward breakage. In the prior art, to overcome this deficiency, the ceramic cast tool was usually formed very thick which makes the tool heavy and difficult to handle and uses excess material.

Other techniques have been tried in the past to increase the tensile strength of the ceramic castings. Some of these were addition of metal rods, metal needles, chopped fiberglass, and chopped graphite fiber. However, for various reasons these approaches have not been successful. Ceramic castings containing metal rods were subject to detached bonds at elevated temperatures due to the difference in thermal expansion between the metal rods and the ceramic casting material. Castings containing metal needles were prone to warp when subjected to thermal cycles and the tensile strength was not significantly improved. Chopped fiberglass and graphite fibers did not significantly improve the tensile strength because of the lack of a bond between the fiber and the surrounding ceramic material.

SUMMARY OF THE INVENTION

It is, therefore, an object of the present invention to provide a reinforced ceramic casting with increased tensile strength.

It is another object of the present invention to provide a reinforced ceramic casting with increased tensile strength at elevated temperatures.

It is still another object of the present invention to provide a method of fabricating a reinforced ceramic casting having superior tensile strength.

Briefly, in accordance with the invention, there is provided a reinforced ceramic structure comprising a ceramic casting having a composite rope embedded therein. The composite rope is of a material having substantially the same thermal expansion rate as the ceramic material. Preferably, there are a plurality of composite ropes used. In a preferred form of the invention, these are composite cross ropes which aid in forming of the structure. The composite rope can be provided with an epoxy resin which flows from the composite rope at elevated temperatures to produce a bond of the rope surface to the ceramic material.

In another form of the invention, there is provided a method of forming a reinforced ceramic structure. In this method, composite rope members are positioned in a mold. Castable ceramic material is poured into the mold. The structure is allowed to cure and heated to remove moisture. Depending on the material used for the composite rope, the structure would be further heated to allow flow of resin into the ceramic material to form a bond between the rope members and the ceramic material.

While the invention will be described in connection with the preferred embodiments, it will be understood that it is not intended to limit the invention to those embodiments. On the contrary, it is intended to cover all alternatives, modifications, and equivalents that may be included within the spirit and scope of the invention as defined by the appended claims.

DETAILED DESCRIPTION OF THE INVENTION

Figure 1:
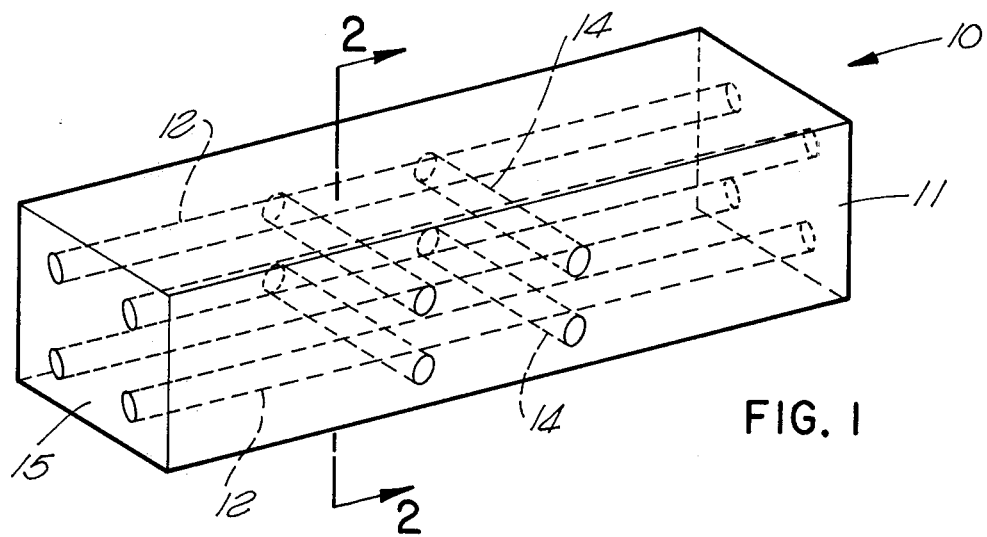
FIG. 1 is a perspective view of a reinforced ceramic structure according to the present invention having composite rope implanted in a ceramic casting.
Figure 3:
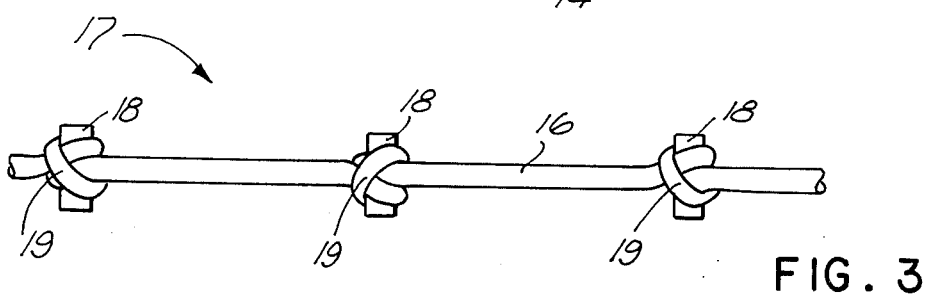
FIG. 3 is a perspective view of composite rope with rod-like cross members attached thereto.

Referring now to FIG. 1, there is shown according to the present invention a reinforced ceramic structure generally indicated at 10. Ceramic casting 11 is made from a hydrosetting (also referred to in the art as "hydraulic setting") ceramic material. Hydrosetting ceramic is one set by water which is subsequently removed by drying. For example, plaster of Paris is a hydrosetting ceramic. Hydrosetting ceramics suitable for use in making Applicant's structure can be obtained from Glasrock Products, Inc., Georgia under product designation "Castable S-820" or from Thermosil Products, Inc., Georgia under the designation "No. 120 Castable". Composite rope (or equivalently rod) members 12 and 14 are embedded in casting 11. Rope members 12 and 14 are formed from strands of composite fibers. The strands are formed from unidirectional composite fibers. Unidirectional fibers are preferred as this provides the greatest tensile strength. The preferred material of the composite rope 12 and 14 for applications where the temperatures are moderate (250° F. to 350° F.) is graphite epoxy, i.e. graphite fibers in an epoxy matrix, while the preferred material of the composite rope 12 and 14 for applications where the temperatures are elevated (1000° F. to 1800° F.) is silicon carbide. These materials have substantially the same thermal expansion rate as the ceramic material. Preferably, the composite threads are twisted together to form the strands and the strands are twisted together to form the rope reinforcing member, but such twisting is not required. With graphite epoxy composite rope, the fibers and strands are adhesively bonded together. Resin may be added to the silicon carbide rope to bond the strands together, but this is not required. Alternately, the silicon carbide reinforcing members can be knotted (as shown in FIG. 3) to hold the strands together.

Figure 2:
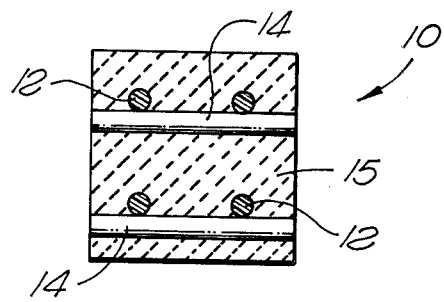
FIG. 2 is a sectional view of FIG. 1 taken in the direction of arrows 2—2 illustrating the transverse supporting rope.

When the composite rope is made from graphite epoxy, the composite rope is staged to obtain some stiffness for easier handling. Staging is accomplished by heating to a temperature normally less than the curing temperature. Specifically, it has been found that graphite epoxy rope can be heated to a temperature of about 175° F. for about 30 minutes to one hour to result in a member which is suitably staged and stiffened for the present invention. Composite cross rope members 14 as best seen in FIG. 2 are placed in the mold (not shown, for forming the structure) perpendicular to and beneath the composite rope members 12. Members 14 have their ends fastened to the mold sides to provide support for the composite rope members 12. This technique allows the composite rope members 12 to stay aligned in the proper direction (to strengthen resistance to tensile stress on the formed structure) when pouring the wet ceramic material into the mold.

In forming the ceramic structure generally shown at 10 using graphite epoxy rope, the composite rope members 12 are placed in the mold, cross rope members 14 are affixed to the rope members 12 and the ends of cross rope members 14 are affixed (as by glue) to the sides of the mold (when the rope members are of silicon carbide and the strands are not adhesively bonded together or joined by knotting the respective members, having the rope members affixed together, as by being tied together, and members 14 affixed to the mold, holds the strands of each reinforcing member together). Then wet ceramic material is poured into the mold containing rope members 12 and 14.

The ceramic structure 10 containing the composite rope 12 and 14 is allowed to cure at room temperature (about 70° F.). Structure 10 is thereafter placed in an oven where the temperature is raised to approximately 200° F. until all the moisture is removed from the casting. When using graphite epoxy rope, the temperature is thereafter raised to 350° F. for a minimum of one hour. This allows the epoxy resin from composite rope 12 and 14 to flow into the ceramic material 15 forming an excellent bond between the rope members 12 and 14 and the ceramic material.

In another embodiment of composite rope member, generally shown at 17 in FIG. 3, steel rods are mechanically affixed, as by knots 19 in silicon carbide rope 16, to the composite rope 16 at selected intervals. Alternately, separate fastening means (not shown) can be used instead of knots 19. The steel rods 18 are used to provide a mechanical lock between the rope members 16 and the ceramic cast material. The size of the steel rods 18 are such that effects of difference in rate of thermal expansion of rods 18 relative to the ceramic material are minimal. This embodiment uses a technique similar to the previous embodiment for forming the ceramic structure by using cross rope members 14 of silicon carbide affixed to the sides of the mold to keep the rope members 16 aligned in the desired direction. Thus, the cross rope members 14 are placed in the mold (not shown), silicon carbide rope members 16 are placed in the mold, and the wet ceramic material is poured into the mold containing rope members 14 and 16. The ceramic casting 11 having the silicon carbide rope members 14 and 16 is allowed to cure at room temperature. Thereafter, the casting is placed in an oven where the temperature is raised to approximately 200° F. until the moisture is removed from the casting. Further heating is not necessary as no resin is present.

Figure 4:
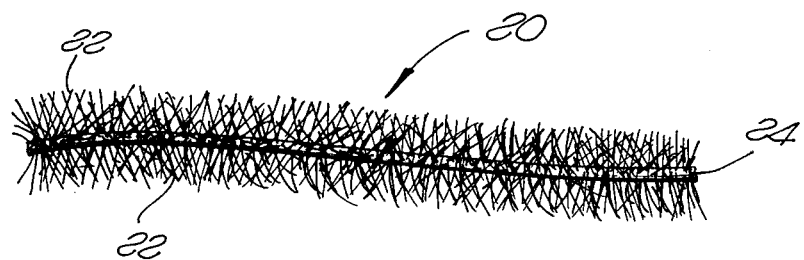
FIG. 4 is a perspective view of composite rope with short bristle-like composite fibers entwined and set to protrude outwardly to the rope axis.

Another embodiment of a composite reinforcing rope member is illustrated in FIG. 4. This rope member, generally shown at 20, has a plurality of short, bristle-like composite fibers 22 entwined and set to protrude outwardly from the rope 24. It has been found that the bristle-like composite fibers 22 help prevent the chipping and cracking at the edges of the ceramic structure which can be expected in rough usage. Preferably the short, bristle-like fibers 22 and rope 24 of member 20 are made of graphite epoxy. In such case, the drying and curing of the casting 11 with the embedded rope member is as described for the first embodiment. This causes the resin to flow from member 20 into the surrounding ceramic material thereby forming an excellent bond.

Thus, it is apparent that there has been provided, in accordance with the invention, a reinforced ceramic structure and method of fabrication thereof that fully satisfies the objectives, aims, and advantages set forth above. While the invention has been described in conjunction with specific embodiments thereof, it is evident that many alternatives, modifications, and variations will be apparent to those skilled in the art in light of the foregoing description. Accordingly, it is intended to embrace all such alternatives, modifications, and variations that fall within the spirit and scope of the appended claims.

What is claimed is:

1. A reinforced ceramic structure comprising:
a casting of hydrosetting ceramic material; and
a reinforcing member embedded in said casting, said reinforcing member being of a material having substantially the same thermal expansion rate as said ceramic material, said reinforcing member being adhesively bonded to said casting, said reinforcing member being formed of composite rope having a plurality of strands, said strands being formed from unidirectional graphite fibers in an organic matrix, said fibers being adhesively bonded together, said strands being adhesively bonded together, said reinforcing member being aligned in said casting in a direction to oppose tensile stress on said casting, said reinforcing member being adhesively bonded to said casting by said organic matrix.

2. The reinforced ceramic structure of claim 1 wherein said organic matrix is epoxy.

3. A reinforced ceramic structure comprising:
a casting of hydrosetting ceramic material; and
a plurality of reinforcing members embedded in said casting, said reinforcing members being of a material having substantially the same thermal expansion rate as said ceramic material, said reinforcing member being adhesively bonded to said casting, said reinforcing members being formed from unidirectional graphite fibers in an organic matrix, said fibers being adhesively bonded together, said strands being adhesively bonded together, a first portion of said reinforcing members being aligned in said casting in a direction to oppose tensile stress on said casting, said first portion of said reinforcing members being spaced from one another, and a second portion of said reinforcing members being embedded in said casting transverse and adjacent to said first portion of said reinforcing members, said second portion of said reinforcing members being spaced from one another, said reinforcing members being adhesively bonded to said casting by said organic matrix.

4. The reinforced ceramic structure of claim 3 wherein said organic matrix is epoxy.

5. The reinforced ceramic structure of claim 4 wherein said first portion of reinforcing members is positioned in the longitudinal direction of said casting.

6. The reinforced ceramic structure of claim 1 wherein said reinforcing member has a plurality of rods affixed to said reinforcing member transverse to said reinforcing member at selected intervals along said reinforcing member, said rods providing a mechanical lock between said reinforcing member and said casting.

7. The reinforced ceramic structure of claim 3 wherein each of said reinforcing members of said first portion of reinforcing members has a plurality of rods affixed transverse thereto, said rods providing a mechanical lock between said first portion of reinforcing members and said casting.

8. The reinforced ceramic structure of claim 1 wherein said reinforcing member has a plurality of bristle-like graphite composite fibers entwined in said reinforcing member, said fibers extending outwardly from said composite rope.

* * * * *